Nov. 7, 1933.  A. J. FARRAR  1,933,722
AUTOMATIC LUBRICATING MECHANISM
Original Filed Nov. 11, 1929   3 Sheets-Sheet 1
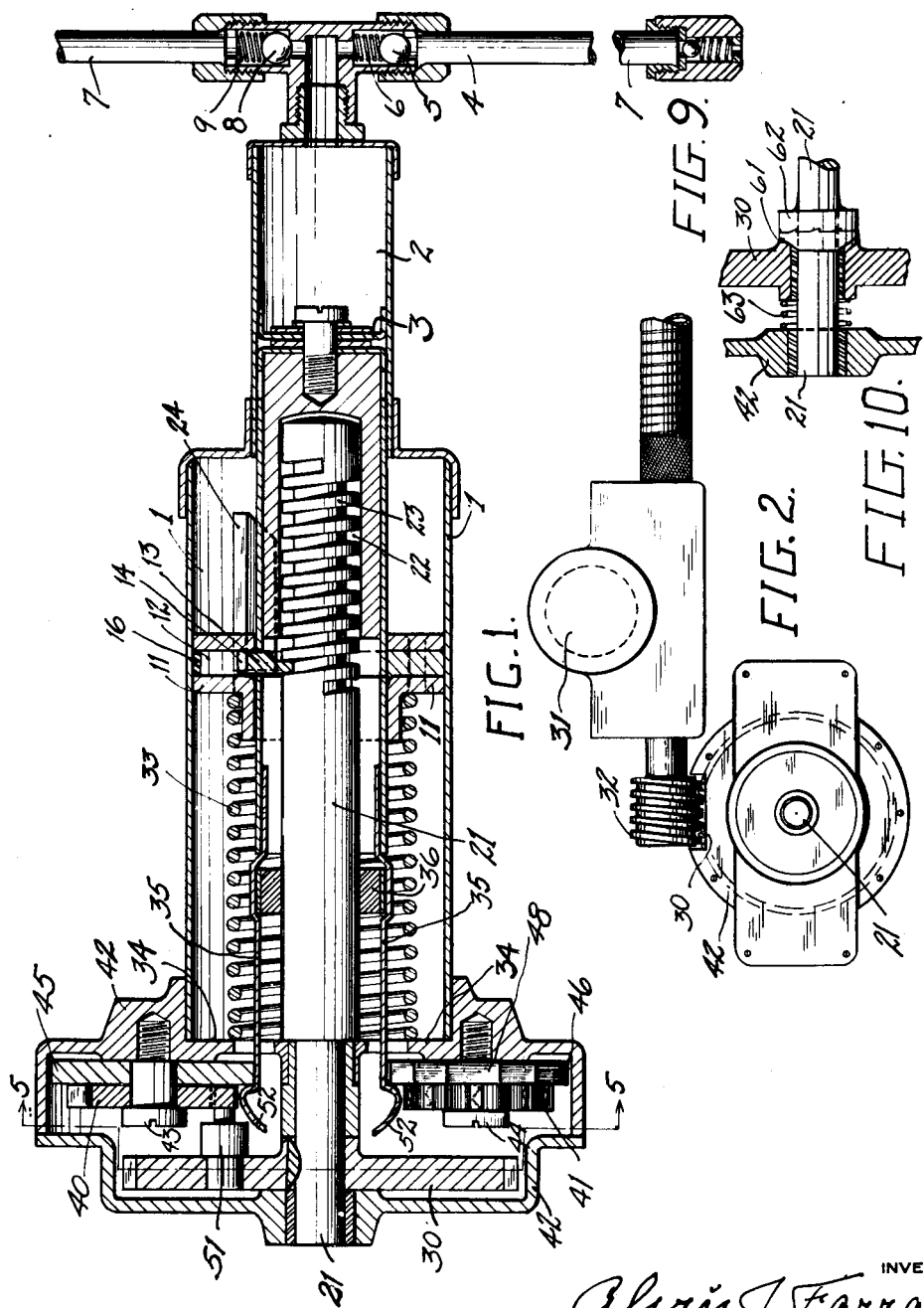
INVENTOR
Alvin J. Farrar,
BY
Justin W. Macklin
ATTORNEY Nov. 7, 1933.  A. J. FARRAR  1,933,722

AUTOMATIC LUBRICATING MECHANISM

Original Filed Nov. 11, 1929   3 Sheets-Sheet 2

INVENTOR
Alvin J. Farrar,
BY
Justin C. Machlin
ATTORNEY

Nov. 7, 1933.  A. J. FARRAR  1,933,722
AUTOMATIC LUBRICATING MECHANISM
Original Filed Nov. 11, 1929    3 Sheets-Sheet 3
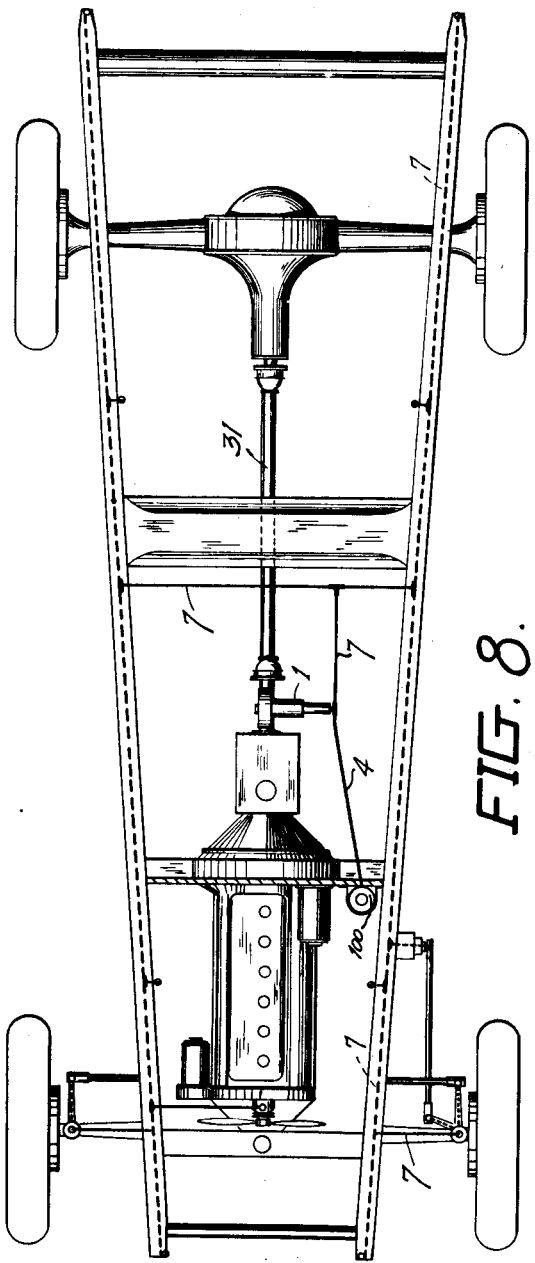
INVENTOR
Alvin J. Farrar
BY
Justin LeMacklin
ATTORNEY Patented Nov. 7, 1933

1,933,722

UNITED STATES PATENT OFFICE 1,933,722

AUTOMATIC LUBRICATING MECHANISM

Alvin J. Farrar, Cleveland, Ohio

Application November 11, 1929, Serial No. 406,193. Renewed July 8, 1933

33 Claims. (Cl. 74—14)

This invention relates to an apparatus for lubricating machinery and railroad cars, and more particularly to a means for supplying lubricants automatically to automobile chasses, springs and moving parts.

It is well known that best results are obtained by supplying lubricants to machinery at predetermined or regular intervals, and it is preferable to cause such supply in amounts proportional to the actual movement of the working parts.

Due to the fact that most automobile owners have no technical knowledge, and due to neglect and other causes, lubrication is often overlooked or so long delayed that the apparatus is subjected to undue wear. Correspondingly, excessive lubrication occurs at times tending to collect dust and grit, damaging the working parts.

The devices now in use for lubricating machines depend for their proper operation upon the skill and judgment of the operator of the car, as they must be operated either at predetermined times, for instance, once daily, or when the operator decides lubrication is required. As in most cases, more than one person operates the same car, it is apparent that proper lubrication is seldom obtained.

It is one of the objects of my invention to eliminate these dangers by supplying lubricant automatically to the various parts at variable intervals, depending upon the amount of operation and preferably depending upon the revolutions of the drive shaft, or miles traveled by the car. By so doing, I may eliminate the human element and provide sufficient lubricant where desired and when necessary, and yet not supply an excess.

The intervals of supply of the lubricant in such a machine as an automobile have such a relationship to the operation of the working parts that many thousands of revolutions of the engine, propeller shaft or wheels occur between them. The natural or usual solution of the problem requires many reduction gears, adding to the expense and weight and some of which are subject to prohibitive wear.

To make a commercially practicable apparatus of this character, my object is to provide a minimum number of working parts responsive to a running element of the machine, and which shall eliminate much reduction gearing. To do this I make use of a controlling mechanism including a permutable mechanism, or the like, governing the periodical forcing out or releasing of lubricant.

A still further object is to provide such an apparatus which can be attached easily to any vehicle, and which is very economical to manufacture.

Another object is to assure a supply of lubricant being on hand when required, and easily obtained at any gas filling station without loss of time necessitated by the usual oiling methods.

Other objects of my invention will become apparent in the following description, in which reference is made to the drawings, like numerals being used to designate the same parts in different views.

In the drawings—

Fig. 1 is a longitudinal sectional view of one form of my invention.

Fig. 2 illustrates a convenient means of actuating my apparatus.

Fig. 8 is a somewhat diagrammatic plan view showing my invention as applied to an automobile chassis.

Fig. 9 is a sectional view of a discharge valve for the conduits.

Fig. 10 is a partial sectional view showing a safety connection for use between the driving gear and shaft of the gun.

Figures 3, 4:
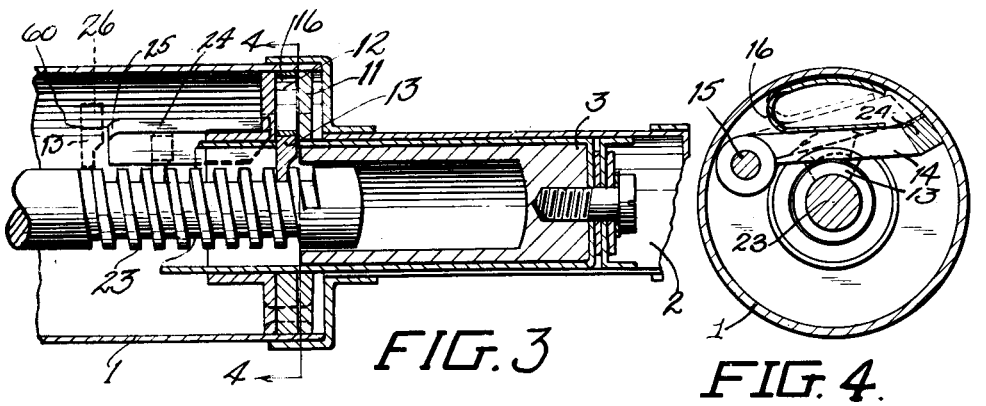
Fig. 3 is a partial longitudinal section of the apparatus shown in Fig. 1, showing the same in a different stage of its operation.
Fig. 4 is a section along the line 4—4 of Fig. 3.

Referring to the drawings, Fig. 1 illustrates a satisfactory form of lubricant ejector and controlling mechanism, comprising a cylinder 1, provided with a reduced extension forming a pumping chamber 2, in which operates a reciprocating plunger 3. The cylinder 1 is rigid with a head member 42, in which are mounted a timing and releasing mechanism, later to be described, and a rotatable shaft 21, which extends into the cylinder 2. The inner end slidably and rotatably extends into the hollow plunger 3.

Figure 7:
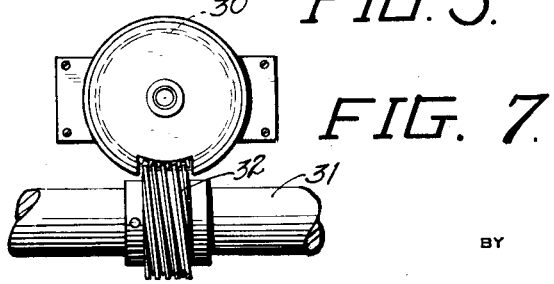
Fig. 7 shows a modification of the actuating means shown in Fig. 2.

Mounted on and rigid with the shaft 21 is a gear 30, actuated through intermediate gears by the driving shaft 31 of the vehicle, such as through the worm gear 32 on the speedometer gear shaft, illustrated in Fig. 2, or by a more direct connection illustrated in Fig. 7. Means are provided within the cylinder 2 to reciprocate the plunger 3 intermittently, consequent upon rotation of the gear 30 and shaft 21.

Lubricant is supplied to the pumping chamber 2 from a lubricant reservoir 100 through a conduit 4, and is forced out of the pumping chamber 2 through a distribution conduit 7, which communicates with branches leading to the points where lubrication is desired.

The conduits 4 and 7 are shown as connected to the pump chamber 2 by a suitable T connection. They are provided with check valves 5 and 8, seated by the usual springs 6 and 9, respectively, which operate to permit flow of lubricant from the conduit 4 into the pumping chamber 2 on the suction stroke of the plunger 3, and from the pump chamber 2 out through the distributing conduit 7 on the ejection stroke.

The plunger 3 may be actuated on its suction stroke by a worm gear 23 on the shaft 21. This is accomplished by use of a collar 11, secured to the plunger 3 and slidable within hollow cylinder 1, and a nut segment or follower key 13, carried by an arm 14 pivoted on a pin 15 secured to the collar 11. The follower key 13 is adapted to engage the threads 23, which force the key to the left as the shaft 21 is rotated. A spring 16 may be used to insure proper seating of the key in the thread.

Between the collar 11 and the head member 42 is a spring 33, which is compressed as the key 13 moves the collar 11 and plunger 3 toward the head 42. Resilient arms 35 are provided on the plunger 3 and adapted to lock the plunger 3 in the withdrawn position as illustrated in Fig. 3. The resilient arms 35 are shown rigidly connected to a cylinder secured to the plunger and collar 11 and extend through the head 42. Here they are provided with shoulders or outward projections 52 engaging the flat faces of step by step rotatable disks 45 and 46. The shoulder engagement with the edges of these disks thus holds the spring 33 under compression in its rest position, until released, as will be hereinafter more fully described.

Means are provided to lift the follower 13 clear from the threads 23 upon the completion of the suction stroke. Such means include a lug 24 secured to the cylinder 1 and provided with a bevelled shoulder 25. This lug is so located that, as the follower key 13 reaches the end of the threads 23 and rises to the top of the threads as illustrated in dotted lines at 60, Fig. 3, and is moved slightly to the right by the spring 33, the key arm 14 engages the shoulder 25 and rises thereon to the upper surface of the lug 24, lifting the follower 13 free from the threads. In order to allow this slight movement of the follower key 13 to the right, the resilient arms 35 may be of such a length that the shoulders 52 reach a position slightly beyond the polygonal disks 45 and 46 at the instant that the follower key rises to the top of the last thread. This arrangement eliminates the danger of the follower key 13 dropping back into engagement with the threads 23 when the plunger is released. After this slight initial movement, the shoulders 52 engage the disks 45 and 46 as described.

The lubricating device so far described has many advantages and is illustrative of one form of lubricant ejector that may be used in connection with my timing and releasing means about to be described.

My timing mechanism comprises a plurality of star gear wheels, such as 40 and 41, rotatably mounted within the head member 42 on suitable pins 43 and 44 respectively, and operable by the gear 30. Polygonal disks 45 and 46, rotatable with the star gears 40 and 41 respectively, as stated, hold the plunger 3 in its withdrawn position.

The resilient arms 35 are shown as flat spring members fitting against the flattened surfaces 48 on the periphery of the polygonal disks 45 and 46. On each disk one such surface is cut back to provide notches or openings 49 and 50 slightly larger than the shoulders 52 and 53 of the respective resilient arms 35 so that, when aligned with the respective shoulders, the shoulders are free to pass through them.

It should be noted that engagement of any one disk with its coacting resilient arm and its shoulder is sufficient to retain the plunger in withdrawn position. Therefore, all of the openings must be aligned with their respective shoulders concurrently before the plunger will be released.

It is essential that this concurrent alignment of the disk notches 49 and 50 and their respective resilient arms 35 occurs only once for a very large number of revolutions of the shaft 21. To achieve this result, the star gears 40 and 41 are provided with a different number of teeth, and are rotated step by step by intermittent engagement of a pin 51 secured and rotatable with the gear 30. By this arrangement, each star gear is rotated through an angular distance equal to the angular distance between two of its adjacent teeth once each revolution of the shaft 21 and gear 30.

This results in each star gear completing a revolution for each number of revolutions of the shaft 21 equal to the number of teeth of such star gear. The star gears, therefore, complete a number of complete revolutions concurrently only once for each number of revolutions of the shaft 21 and gear 30 equal to the least common multiple of the numbers of teeth of the star gears.

Figures 5, 6:
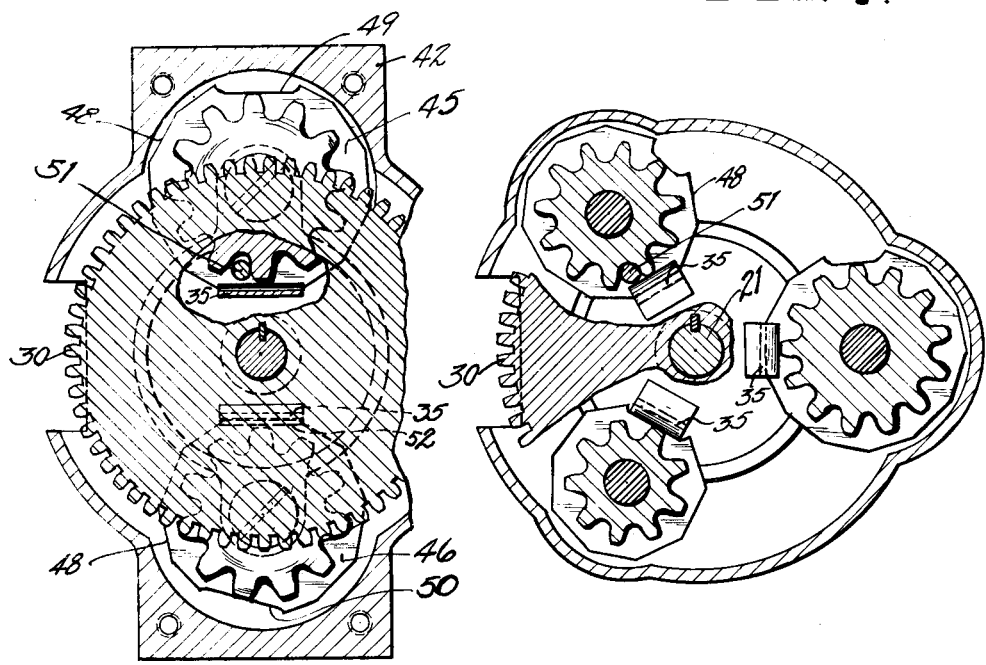
Fig. 5 is a partial section of the releasing means, taken along the line 5—5 of Fig. 1.
Fig. 6 is a similar view showing a modification of the releasing means shown in Fig. 5.

It is apparent that by varying the number of teeth of the star gears, a wide range of control relative to the speed of the shaft 21 is possible. A still greater range may be obtained by increasing the number of polygonal disks and coacting star gears, as illustrated in Fig. 6. When the notches of all the polygonal disks are aligned with their respective resilient arms concurrently, the arms are released and the plunger 3 is driven on its compression stroke by the spring 33. This action forces the lubricant out through the conduit 7 to the points where required.

As the plunger 3 moves on its compression stroke, the arm 14 rides along the lug 24, until it reaches the end thereof and swings down, allowing the follower key 13 to engage the threads 23. At this time, the notches 49 and 50 have again passed out of alignment with the resilient arms 35. The follower key immediately moves to the left, driving the plunger on its suction and resetting stroke, and forcing the shoulders 52 of the arms 35 past the polygonal disks 45 and 46, until it rises from the threads 23, moves slightly to the right and is clear of the threads, as described. The plunger 3 is then locked in position until the notches 49 and 50 have again aligned concurrently with their respective resilient arms and shoulders, at which time the plunger is again actuated.

To regulate the distribution of lubricant, it is desirable to equip the outlets of the conduit 7 with valves adjusted to predetermined pressures. A suitable valve, similar to the valve 8, is illustrated in Fig. 9.

A safety pressure line, not shown, may lead from the remote side of the discharge valve 8 back to the lubricant reservoir 100. Such a line or conduit should contain a pressure valve, adjusted to permit oil return only when one or more of the distribution lines is clogged.

To assure safety and accuracy in operation, as stated, it will be noted that polygonal disks 45 and 46 have the flattened surfaces, one for each of the notches of its respective star wheel, which, after each actuation, fits against the correspondingly flat surface of the resilient retaining arms 35. Thus although these parts are loosely and/or even inaccurately made, they will come to rest in position to receive the next impulse, and will not overrun and disturb the mathematical certainty of the permutation.

Another means for securing certainty and safety in operation and for preventing damage to the follower key and threads or the retaining arms and their heads engaging the polygonal disks in case of a momentary reversal of the shaft 21, which might occur at an instant just after the heads of the retaining arms 35 have passed the disks and before the follower key is freed from the threads, is a ratchet mechanism such as shown in detail in Fig. 10. On the hub 61 of the gear 30 may be formed ratchet teeth coacting with ratchet teeth on the shoulder 62, in this case formed on the shaft 21. A spring 63 between the end wall of the casing and the gear 30 urges with these ratchet teeth into engagement. The teeth, of course, are so shaped as to rotate the gear only on the movement for actuating the plunger.

From the foregoing description it will be seen that I have provided a simple, effective mechanism for periodically controlling the distribution of the lubricant to various parts of an apparatus, such as an automobile, which is compact and capable of economical manufacture and convenient adaptation to present constructions.

It will further be seen that while it is advantageous to actuate this mechanism from a rotating element at all times driven with the wheels, it is also useful, and in many instances satisfactory, to operate it from moving parts of the motor, or it may be actuated by any means rendered active only when the automobile or machine is in use.

Further modifications or adaptations of my mechanism may include the use of the present motor oil systems, utilizing pressure, and in such case it will be only necessary to cause the timing or permutating mechanism to release a valve. Another adaptation of the invention contemplated may comprise means whereby the permutating mechanism upon reaching a certain combination physically actuates a lubricant release or a lubricant forcing mechanism.

It will also be seen that this permuting mechanism which eliminates the usual or natural reduction gearing, and which, as stated, causes an actuation only upon many thousands of revolutions of a moving part of the vehicle, may comprise various modifications of a plurality of step by step, settable elements, a certain combination of which may actuate any desired controlling device, and I do not wish its use to be limited to lubricating devices.

I claim:

1. In a devise to be actuated intermittently, a driving member, a driven member, a plurality of settable elements driven by the driving member in different respective cycles into and out from a predetermined relative position with respect to each other, means mechanically, operatively engaging the driven member and engaging each of the settable elements individually for effecting actuations of the driven member by the driving member, said means operating consequent upon setting of said settable elements in said predetermined relative position.

2. In a lubricant ejector, pump, a driving member and a reciprocable member operatively associated with said pump and engageable and disengageable with the driving member for actuating said pump, a plurality of driven settable elements operatively associated with the reciprocable member and normally holding said reciprocable member in disengaged position, said elements being advanced by a source of power to a predetermined position relative to each other, said settable elements initiating engagement of said reciprocable member and driving member consequent upon such predetermined position of said settable elements.

3. A pumping mechanism comprising a pump, a driving member, a device for drivingly connecting and disconnecting said pump and member, a plurality of permutatable settable elements, means engageable with each of said elements and normally maintaining said connecting device idle when in engagement with said elements, said means being disengageable from each of said elements simultaneously consequent upon movement of the settable elements to a predetermined relative position with respect to each other for permitting the device to become active, and a driving connection between the settable elements and said driving member.

4. A pumping mechanism, comprising a pumping means, a restraining means for restraining operation of the pumping means, a plurality of driven settable elements in driven relation to a source of power and driven thereby in different respective cycles, each element engaging the restraining means, said elements normally rendering the restraining means active, said elements simultaneously disengaging the restraining means consequent upon movement of the elements to a predetermined relative setting with respect to each other, whereby the pumping means is rendered active and idle intermittently.

5. A pumping mechanism, including a pumping chamber and a pump plunger reciprocable therein, means for driving the plunger in one direction to a given position and means to drive the plunger in the opposite direction to another position, a driving member for driving one of said means, a permutatable mechanism operatively connected with the plunger for retaining the pluger in one of said positions and for releasing the plunger intermittently, said mechanism comprising a plurality of settable elements, and means for driving the elements in different respective cycles, said plunger normally operatively engaging each element individually and being restrained thereby in one of said positions, said settable elements operatively disengaging from the plunger simultaneously when the elements are driven into a predetermined relative position with respect to each other.

6. A pumping mechanism, including a pumping chamber and a plunger reciprocable therein, a spring for actuating the plunger on one stroke, means for stressing the spring, a plurality of permutatable settable elements, an operably restraining connection between each element individually and the spring, means for moving the settable elements in different respective cycles into different relative positions with respect to each other, each of said elements operably disconnecting from said spring consequent upon setting of the particular element in a given position and each element effecting a restraining connection with the spring in another position of the element, whereby said elements maintain operable restraining connection with said spring until a predetermined relative position of all of the elements with respect to each other is reached and release said connection concurrently when said relative position is reached.

7. A pumping mechanism comprising a pumping means, a driving means therefor, a device for rendering said pumping means idle and active intermittently, said device including a plurality of movable elements, each element having a different number of projections thereon, a driving member engaging the projections of said elements for driving said elements in different respective cycles, means carried by the settable elements and mechanically coacting with the pumping means and permitting actuation of the pumping means by the driving means when the elements are in a predetermined relative position, said elements mechanically restraining the pumping means when the elements are out of said relative position.

8. In an intermittently operating mechanism, a driving member, a driven member, and movable means operably engageable and disengageable with the driving member and operatively connected with the driven member for drivingly connecting said members, a plurality of settable elements drivingly connected with the driving member, said elements being advanced thereby in different respective cycles into and out of predetermined relative position with respect to each other, said elements individually operably engaging said movable means and initiating engagement of said means and said driving member consequent upon setting of said elements in said predetermined position.

9. In a device to be actuated intermittently, a driving member, a driven member, means for drivingly associating said members, a plurality of driven permutatable members, coacting means operatively connected to the driven member and engaged by each of said permutatable members for normally restraining operation of the driven member, the permutatable members simultaneously disengaging the coacting means at a predetermined relative position of said permutatable members with respect to each other for releasing the driven member and means for driving the permutatable elements in different respective cycles into and out of said predetermined relative positions.

10. In a mechanism to be actuated intermittently, a driving member, a driven member, means operatively associated with the driven member and engageable and disengageable with the driving member for effecting a driving connection and disassociation successively therebetween, a plurality of settable elements in driven relation to the driving member and advanced thereby in different respective cycles into a predetermined position with respect to each other, each of said elements individually operatively engaging said means, said elements actuating engagement of said means and driving member consequent upon setting of the elements in said predetermined relative position.

11. In a device to be actuated intermittently, a plurality of driven settable elements, means for driving said elements through different respective cycles into and out of predetermined relative positions with respect to each other, a cooperating latching means associated with a movable member of the mechanism and engaging each of said elements individually and normally being retained in latched position by each element and being disengaged by each element when each particular element is in a predetermined position whereby said latching means is rendered idle consequent upon setting of said settable elements simultaneously in disengaging position for permitting operation of the member of the mechanism.

12. In a mechanism to be operated intermittently, a driving member, a driven member, a device for drivingly connecting and disconnecting said members together, a plurality of driven permutatable elements and means for driving said elements in different respective cycles, means associated with the device and engageable with each element individually for maintaining said connecting device idle when the elements are in certain relative positions with respect to each other, said means disengageable from said elements consequent upon positioning of the elements in a different predetermined relative position with respect to each other, and thereby permitting said device to effect the driving connection.

13. In a device to be actuated intermittently, a driving member, a driven member, restraining means rendering said members drivingly disassociated when the restraining means is active and permitting driving association of the members when the restraining means is inactive, a plurality of driven settable elements in driven relation to said driving member and driven thereby in different respective cycles, each element engaging said restraining means and each element normally rendering the restraining means active consequent upon said engagement therewith and being disengageable from the restraining means when in a given position, said elements simultaneously disengaging the restraining means consequent upon movement of the elements to a predetermined relative setting with respect to each other whereby the restraining means is rendered inactive at predetermined intervals.

14. In a device to be actuated intermittently, a driving member, a driven member, means for drivingly connecting and disconnecting said members, restraining means operatively connected to the driven member, said means maintaining the members drivingly disconnected when the restraining means are active and permitting the members to drivingly connect when the restraining means are inactive, said restraining means having a plurality of abutment surfaces, a plurality of driven settable elements and means for driving said elements through different respective cycles, each of said elements having surfaces respectively engaging said abutment surfaces of the restraining means and thereby normally rendering the restraining means active, each of said elements disengaging the respective abutment surface of the restraining means when said elements are in a given relative position, said elements simultaneously disengaging from said abutment surfaces of the restraining means consequent upon movement of the elements to a predetermined setting with respect to each other.

15. In a mechanism to be operated intermittently, a driving member, a driven member, means for drivingly associating said members, a plurality of driven notched permutatable members, coacting means operatively connected to the driven member and normally engaged by each of the permutatable members for normally restraining operation of the driven member by the driving member, said coacting means entering the notches of the permutatable members simultaneously at a predetermined relative position of the permutatable members with respect to each other for releasing the driven member, and means for driving the permutatable members through different respective cycles.

16. In a mechanism to be actuated intermittently, a driven member, a spring for actuating the member in one direction, means for stressing the spring, means for latching the spring in the stressed position including a restraining device operatively connected to the spring and having a plurality of shoulders, a plurality of elements, each normally engaging one of said shoulders and each having an opening permitting relative passage of the respective shoulders when the opening is presented to the shoulder, means for driving the elements through different respective cycles to a certain relative position with respect to each other wherein each elements present the respective openings to respective said shoulders concurrently, whereby the spring is released and actuates the driven member in said direction, and means for resetting the spring.

17. In a mechanism to be actuated intermittently, a plurality of movable permutating members arranged to act together simultaneously when moved into a predetermined relative position with respect to each other for initiating actuation of an actutable means and a common setting device arranged to engage and disengage each of the settable elements in turn to advance said members in different respective cycles toward said predetermined relative position.

18. In a device to be actuated intermittently, a driving member, a driven member, a plurality of settable elements adapted to be driven by driving member in different respective cycles into and out of a predetermined position of the elements with respect to each other, means engaging each element and operably associated with the driven member, said means initiating operation of the driven member by the driving member consequent upon setting of elements in said position.

19. In a device to be actuated intermittently, a driving member, a driven member, a plurality of settable elements driven by the driving member, each in a different cycle into and out of respective predetermined positions, means engaging each element and operably associated with driven member, said means being rendered active and idle as to each element consequent upon movement of the particular element into and out of respective positions, and said means initiating operation of the driven member by the driving member consequent upon setting of all said elements into their respective predetermined positions simultaneously.

20. In a device to be actuated intermittently, a movable member, and means adapted to delay movement of the member, a plurality of settable elements, a common actuating element cooperating with each settable element during each cycle of operation of the actuating element for actuating the settable elements to set the same, said means in cooperation with said elements delaying movement of said member until a certain relative position of the settable elements is reached and permitting movement of the member when said relative position is reached.

21. In a device to be actuated intermittently, a movable member, a plurality of settable elements, each operatively engaging the movable member and each of said elements having a different number of projections thereon, a common actuating element having means arranged to engage a projection of each settable element during each cycle of operation of the actuating element for advancing the settable elements into predetermined relative positions with respect to each other, said elements rendering the movable member idle until said relative position is reached and rendering said movable member active when said position is reached.

22. In a device to be actuated intermittently, a rotatable member, a plurality of permutatable elements driven thereby, each element having a different number of projections, a common setting device actuated by said rotatable member and adapted to drivingly engage the same number of projections of all of said elements during each cycle of operation of the setting device for moving said elements in different respective cycles, and means engaging each of said elements to render the device operable consequent upon setting of said elements in a given relative position with respect to each other, said device being rendered inoperable when said elements are out of said predetermined position.

23. In an intermittently operating mechanism, a driving member, a plurality of settable members arranged about said driving member in a common plane, means operatively associated with said driving member for engaging all of said settable members on each cycle of operation of the driving member, and driven means rendered active and idle by said settable members when the same are brought into and out of a predetermined relative position with respect to each other.

24. In a mechanism to be operated intermittently, a driven member, a spring for driving said member and means for stressing the spring, a device for restraining said spring, said device including a plurality of settable elements, each element having a different number of projections thereon, a driven common actuating element coacting with the same number of projections of each settable element during each cycle of operation of the actuating element for actuating the settable elements, said device restraining the spring until a certain relative position of said settable elements is reached and releasing the spring when said relative position is reached.

25. In a mechanism to be actuated intermittently, an actuatable member, a device for initiating an actuation of said member, said device comprising a plurality of movable permutating elements movable in different respective cycles into and out of a predetermined relative position with respect to each other, and means operably associated with the actuatable member and cooperating with each of the permutating elements individually for initiating actuation of the member consequent upon movement of said permutating elements into said predetermined position, and a common setting means arranged to cooperate individually successively with said settable elements to advance them through their respective cycles into and out of said predetermined position.

26. An intermittently operable mechanism including a driven rotatable screw member, a reciprocable member, a traveller element operatively connected to the reciprocable member and engageable with the screw member for driving the reciprocable member in one direction, means for disengaging said traveller element and the screw member upon completion of movement in said direction, means to drive said reciprocating member and element in the opposite direction, a mechanism normally restraining reengagement of the traveller element and screw member and permitting engagement of the element and screw member consequent upon operation thereof through a predetermined cycle.

27. An intermittently operable mechanism including a driven rotatable screw member and a reciprocable member, a traveller element operatively connected to the reciprocable member and engageable with the screw member for driving the reciprocable member in one direction, means for disengaging said traveller element and screw member at the completion of travel in said direction, means for storing energy consequent upon movement of the reciprocable member in said direction for returning said reciprocable member and traveller in the opposite direction, said traveller reengaging said screw member after said return for repeating the operation.

28. An intermittently operable mechanism including a driven rotatable screw member and a reciprocable member, a traveller element operatively connected to the reciprocable member and engageable with the screw member for driving the reciprocable member in one direction, means for disengaging said traveller element and screw member at the completion of travel in said direction, means for storing energy consequent upon movement of the reciprocable member in said direction for returning said reciprocable member and traveller in the opposite direction, and means for initiating reengagement of the traveller member and screw member consequent upon a predetermined number of revolutions of the screw member.

29. In a mechanism for causing intermittent reciprocable motion, a rotatable screw member, a reciprocable member, an element operatively connected to the reciprocable member and engageable with the screw member for driving the reciprocable member in one direction, means for effecting disengagement of said element and screw member upon completion of said movement, means to drive said reciprocable member and element in the opposite direction, a plurality of settable members individually normally restraining reengagement of said first named element and screw member, said settable elements permitting reengagement of said first named element and screw member upon movement of said elements into a predetermined relative position with respect to each other, and means for driving said settable elements in different respective cycles of operation.

30. Mechanism for effecting reciprocating motion comprising a screw threaded rotary driving member, a reciprocating part arranged for movement parallel to said member, a follower associated with the reciprocating part and adapted to engage the threads of said driving member to move said part in one direction, means to disengage the follower from the threads after the part has moved a predetermined distance, separate returning means to return the part and follower to an initial position, and means to hold the follower out of contact with the threads during such return movement of said part.

31. In a mechanism for effecting reciprocating motion, a driving member and a driven member, means to connect the driven member to the driving member to move the former in one direction slowly, cooperating means for rapidly returning said driven member to an initial position, and a timing device for controlling the period at which the driven member may return to said initial position.

32. In a device to be actuated intermittently, a driving member, a driven member, a plurality of settable elements, said elements being movable into and out from a predetermined relative position with respect to each other, means for moving said elements in different respective cycles into said predetermined position, means operably connected to the driven member and engaging said elements individually, said last mentioned means being movable consequent upon setting of said elements in said predetermined relative position and said means initiating operation of the driven member by the driving member consequent upon movement of said means.

33. In a device to be actuated intermittently, a driving member, a plurality of settable elements and driven means operably engaging said elements individually, said means being rendered active consequent upon setting of said elements in a given predetermined position with respect to each other and means for moving said elements in different respective cycles for disposing said elements in said given predetermined relative position.

ALVIN J. FARRAR.